(12) United States Patent
Kim

(10) Patent No.: US 8,259,264 B2
(45) Date of Patent: Sep. 4, 2012

(54) LIQUID CRYSTAL DISPLAY DEVICE WITH VIEWING ANGLE CONTROL AREAS HAVING A BLACK MATRIX THAT DOES NOT OVERLAP WITH THE DATA LINES

(75) Inventor: Hyeok Soo Kim, Gyeongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 602 days.

(21) Appl. No.: 11/637,681

(22) Filed: Dec. 13, 2006

(65) Prior Publication Data

US 2008/0007684 A1    Jan. 10, 2008

(51) Int. Cl.
*G02F 1/1333* (2006.01)
*G02F 1/1335* (2006.01)
*G02F 1/1343* (2006.01)

(52) U.S. Cl. ............. 349/110; 349/106; 349/141

(58) Field of Classification Search .......... 349/141, 349/106, 108, 110–111
See application file for complete search history.

(56) References Cited

U.S. PATENT DOCUMENTS

| 4,009,938 A * | 3/1977 | Yamazaki et al. ............ 349/186 |
| 7,602,460 B2 * | 10/2009 | Choi et al. .................... 349/106 |
| 2005/0140856 A1 * | 6/2005 | Choi et al. .................... 349/110 |
| 2005/0174529 A1 | 8/2005 | Fukushima et al. |
| 2005/0190329 A1 | 9/2005 | Okumura |
| 2005/0219445 A1 | 10/2005 | Kubo |
| 2005/0237447 A1 * | 10/2005 | Ono .............................. 349/106 |
| 2006/0066792 A1 | 3/2006 | Oh et al. |

FOREIGN PATENT DOCUMENTS

| CN | 2670963 | 1/2005 |
| DE | 10 2006 029 909 A1 | 6/2007 |
| JP | 11-030783 | 2/1999 |
| JP | 2006-91871 A | 4/2006 |

\* cited by examiner

*Primary Examiner* — Jessica M Merlin
(74) *Attorney, Agent, or Firm* — McKenna Long & Aldridge, LLP

(57) ABSTRACT

The present invention provides a liquid crystal display device that can electrically control the viewing angle. A liquid crystal display device according to an aspect of the present invention includes a first electrode group on the lower substrate and a first region of liquid crystals in image drive areas controllable according to an applied voltage, and a second electrode group on the lower substrate and a second region of liquid crystals in viewing angle control areas controllable according to an applied voltage, wherein the first region and the second region may be controlled separately.

12 Claims, 8 Drawing Sheets

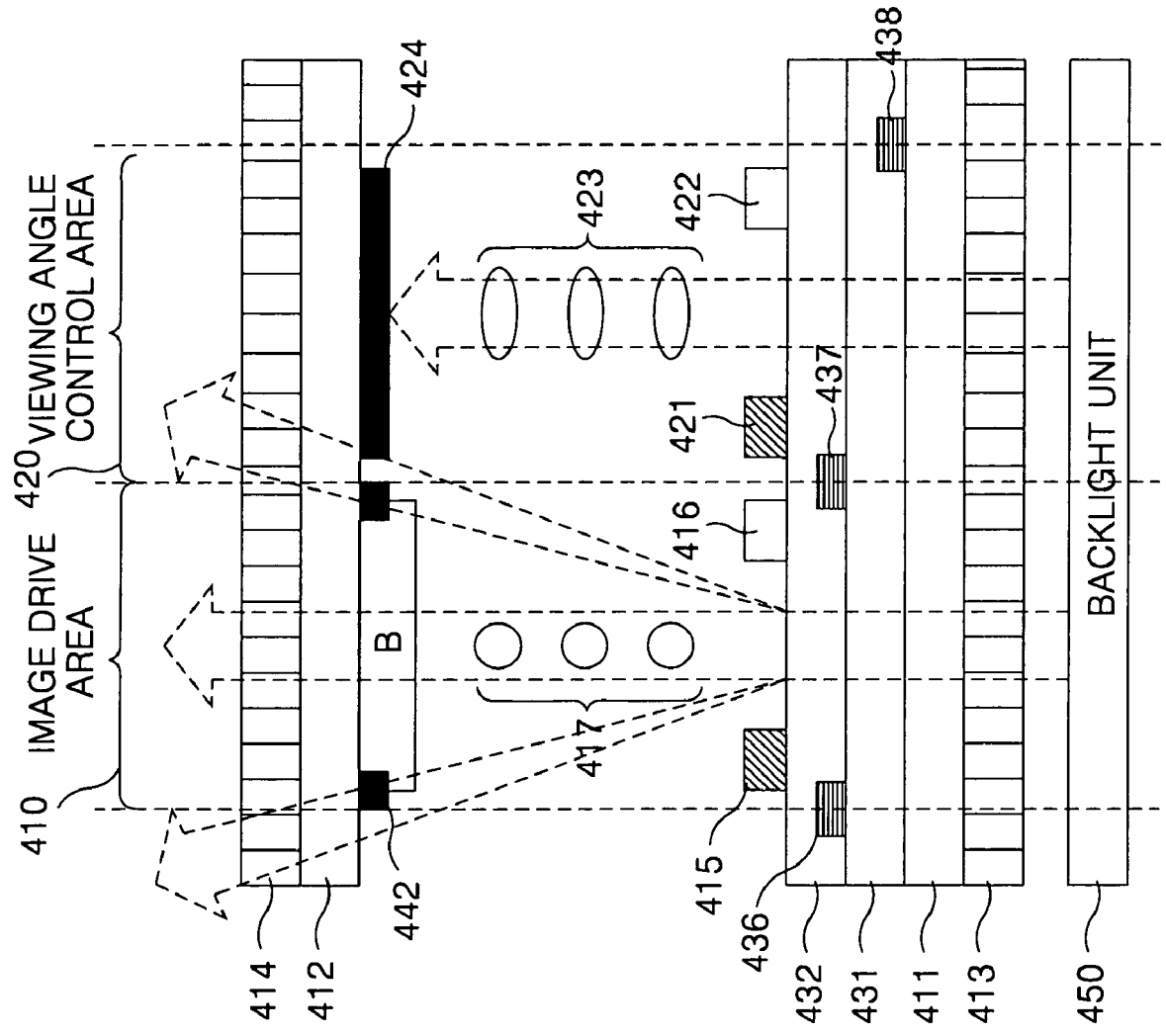

LIQUID CRYSTAL DISPLAY DEVICE WITH VIEWING ANGLE CONTROL AREAS HAVING A BLACK MATRIX THAT DOES NOT OVERLAP WITH THE DATA LINES

This application claims the benefit of Korean Patent Application No. 06-0057397 filed in Korean on Jun. 26, 2006, which is hereby incorporated by reference, for all purposes as if fully set forth herein.

BACKGROUND OF THE INVENTION

1. Field of the Invention

The present invention relates to a liquid crystal display device, and more particularly to a liquid crystal display device that is adaptive for electrically adjusting a wide viewing angle and a narrow viewing angle of a liquid crystal display panel, and a driving method thereof.

2. Description of the Related Art

A liquid crystal display device controls light transmittance of liquid crystal cells in accordance with a video signal to display a picture. An active matrix type liquid crystal display device in which a switching device is formed at each liquid crystal cell is advantageous in realizing a motion picture because it is possible to actively control the switching device. The switching device used in the active matrix type liquid crystal display device is mainly a thin film transistor (hereinafter, referred to as "TFT").

Current liquid crystal display devices do not have a function which electrically controls the viewing angle of the liquid crystal display device to be a wide viewing angle or a narrow viewing angle. To provide privacy using a narrow viewing angle, a narrow viewing angle is set using a viewing angle control film 200, as illustrated in FIG. 1.

As shown in FIG. 2 in the related art liquid crystal display device 100, such as a notebook computer 300, the narrow viewing angle is set by mounting the viewing angle control film 200 at the front surface of the liquid crystal display panel. If the viewing angle control film 200 is removed from the front surface of the liquid crystal display panel in which the narrowing viewing angle has been set, a wide viewing angle is obtained.

In the related art liquid crystal display device like this, a user manually mounts the viewing angle control film 200 at the front surface of the liquid crystal display panel or removes the mounted viewing angle control film 200 to control the narrow viewing angle or the wide viewing angle, thereby causing inconvenience to the user.

SUMMARY OF THE INVENTION

Accordingly, the present invention is directed to a liquid crystal display device and driving method thereof that substantially obviates one or more of the problems due to limitations and disadvantages if the related art.

Accordingly, it is an advantage of the present invention to provide to a liquid crystal display device that is adaptive for electrically adjusting a wide viewing angle and a narrow viewing angle of a liquid crystal display panel and a driving method thereof.

It is another advantage of the present invention to provide a liquid crystal display device that is adaptive to the benefit of the user by electrically adjusting the wide viewing angle and narrow viewing angle of the liquid crystal display panel, and a driving method thereof.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages of the invention, a liquid crystal display device according to an aspect of the present invention includes lower and upper substrates facing each other and bonded together with a cell gap therebetween; a lower polarizer attached to a surface of the lower substrate; an upper polarizer attached to a surface of the upper substrate; liquid crystals in the cell gap; a plurality of image drive areas defined in the bonded lower and upper substrates; a first electrode group on the lower substrate in the image drive areas having an image drive voltage therebetween, the liquid crystals in the image drive areas controllable according to the image drive voltage; and a plurality of viewing angle control areas defined in the bonded lower and upper substrates; a second electrode group on the lower substrate in the viewing angle control areas having a viewing angle control voltage therebetween, the liquid crystals in the viewing angle control areas controllable according to the viewing angle control voltage.

In another aspect of the present invention, a method of driving a liquid crystal display device includes displaying an image by applying an image voltage to a first electrode group in an image drive area; and adjusting a viewing angle by applying a viewing angle control voltage to a second electrode group in a viewing angle control area.

In another aspect of the present invention, a liquid crystal display device includes lower and upper substrates facing each other and bonded together with a cell gap therebetween; a lower polarizer attached to a surface of the lower substrate; an upper polarizer attached to a surface of the upper substrate; liquid crystals in the cell gap; an image drive area defined in the bonded lower and upper substrates; a first electrode group on the lower substrate in the image drive area, the liquid crystals in the image drive area controllable according to an image drive voltage between electrodes of the first electrode group; and a viewing angle control area defined in the bonded lower and upper substrates corresponding at least one image drive area; a second electrode group on the lower substrate in the viewing angle control area, the liquid crystals in the viewing angle control area controllable according to a viewing angle control voltage between electrodes of the second electrode group.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings:

FIG. 5A is a first exemplary diagram representing an operational state of the pixel of the liquid crystal display device of the present invention;

DETAILED DESCRIPTION OF THE ILLUSTRATED EMBODIMENT

Reference will now be made in detail to an embodiment of the present invention, example of which is illustrated in the accompanying drawings.

Figure 1:
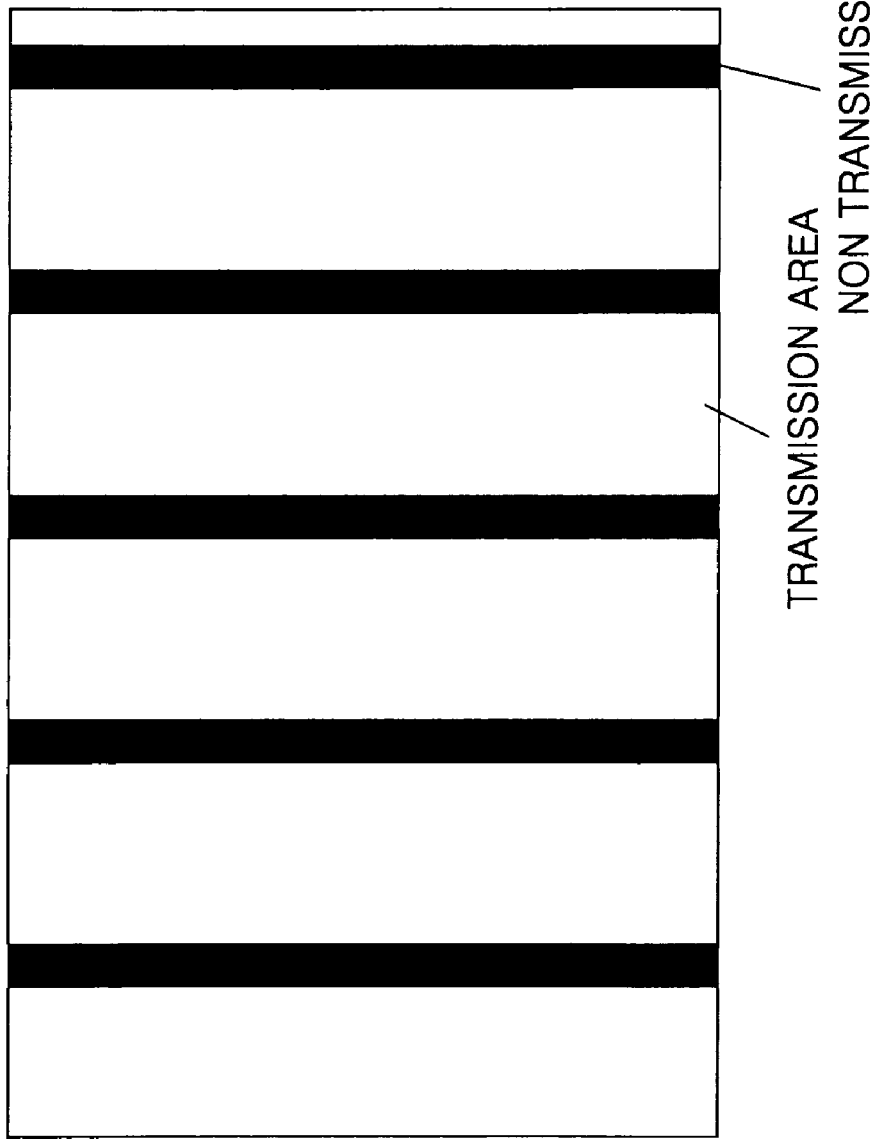
FIG. 1 is a front view of a viewing angle control film used in a liquid crystal display device of the related art.
Figure 2:
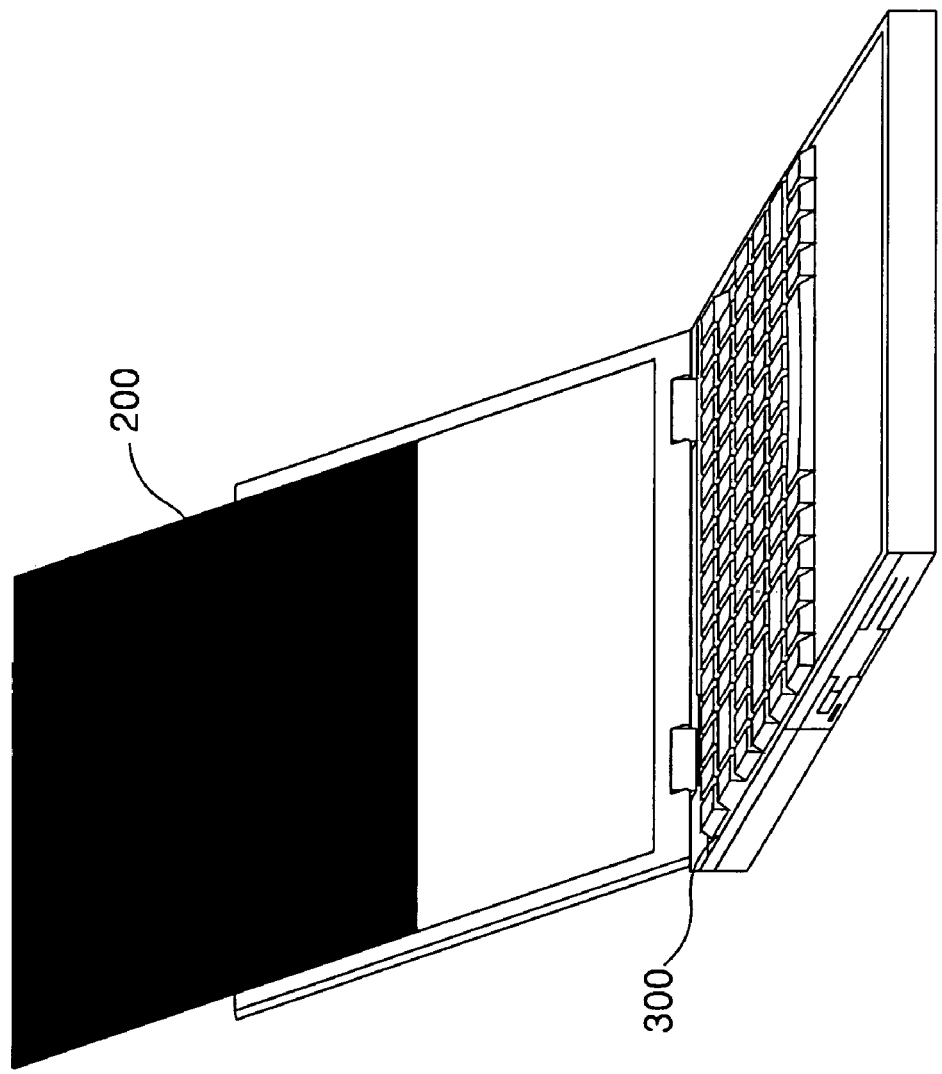
FIG. 2 is an external perspective diagram of a notebook where the viewing angle control film of FIG. 1 is used.
Figure 3:
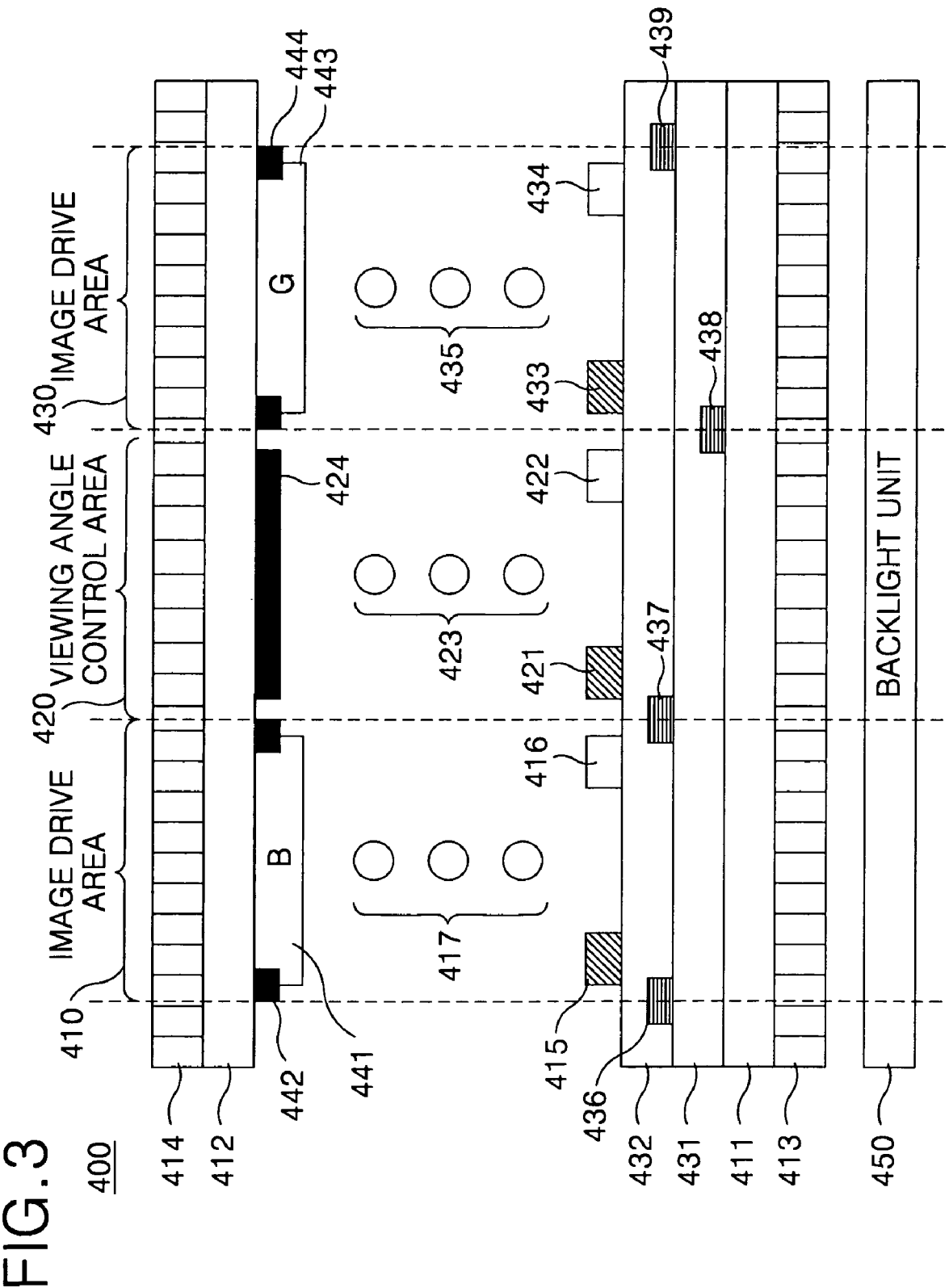
FIG. 3 is a cross sectional diagram of a pixel of a liquid crystal display device according to an embodiment of the present invention.

FIG. 3 is a cross sectional diagram of a pixel of a liquid crystal display device according to an embodiment of the present invention. The liquid crystal display device according to the present example is an in-plane switching mode (hereinafter, referred to as "IPS") in which the liquid crystal display device is driven by a horizontal electric field (e.g., the direction of the electric field is substantially parallel to the liquid crystal display panel surface) between a common electrode and a pixel electrode which are arranged substantially in parallel to a lower substrate of the liquid crystal display panel having upper and lower substrates. The IPS mode liquid crystal display device drives liquid crystal in the horizontal direction, thus there is almost no movement in a vertical direction.

Referring to FIG. 5, the pixel 400 of the liquid crystal display device is divided into image drive areas 410, 430 for displaying an image and a viewing angle control area 420 for controlling a wide viewing angle or a narrow viewing angle.

The pixel 400 of the liquid crystal display device includes a lower substrate 411 and an upper substrate 412 which face each other and are bonded together. A lower polarizer 413 may be correspondingly attached to a lower part of the lower substrate 411; and an upper polarizer 414 may be correspondingly attached to an upper part of the upper substrate 412. Herein, the lower substrate 411 and the upper substrate 412 are commonly disposed in the image drive areas 410, 430 and the viewing angle control area 420.

The viewing angle control area 420 is formed as one sub-pixel included in the pixel which is composed of a plurality of sub-pixels for displaying an image. And, especially, one viewing angle control area 420 is located between the image drive areas 410, 430, as in FIG. 3.

A gate insulating film 431 and an insulating film 432 are formed to be deposited on the lower substrate 411 of the image drive areas 410, 430 which are driven by an IPS mode.

A common electrode 416 and a pixel electrode 415 are separately formed on the insulating film 432 located in the image drive area 410, and a common electrode 434 and a pixel electrode 433 are separately formed on the insulating film 432 located in the image drive area 430. In the same manner, the gate insulating film 431 and the insulating film 432 are formed to be deposited on the lower substrate 411 of the viewing angle control area 420, and a pixel electrode 421 and a common electrode 422 are separately formed on the insulating film 432 located in the upper part of the gate insulating film 431.

A liquid crystal layer 418 is filled in a cell gap formed between the upper substrate 412 and the insulating film 432. The liquid crystal layer 418 has portions in the image drive areas 410, 430 and in the viewing angle control area 420.

A data line 436 is formed on the gate insulating film 431 in the bordering part of the image drive area 410 composed of one sub-pixel and an adjacent sub-pixel (not shown), and a data line 437 is formed on the gate insulating film 431 in the bordering part of the image drive area 410 and the adjacent viewing angle control area 420. Herein, the pixel electrode 415 of the image drive area 410 receives a data voltage supplied through the data line 436, and the pixel electrode 421 of the viewing angle control area 420 receives a data voltage supplied through the data line 437, thus the liquid crystal in the image drive area 410 and the viewing angle control area 420 are driven independently.

The gate line 438 is formed on the lower substrate 411 in the bordering part of the viewing angle control area 420 and the adjacent image drive area 430. Herein, the pixel electrode 433 of the image drive area 430 receives the data voltage supplied through the data line 438, and the pixel electrode 421 of the viewing angle control area 420 receives the data voltage supplied through the data line 437, thus the liquid crystal in the image drive area 430 and the viewing angle control area 420 are driven independently.

The data line 439 is formed on the gate insulating film 431 in the bordering part of the image drive area 430 composed of one sub-pixel and the adjacent sub-pixel (not shown).

A B-color filter 441 is disposed at the under side of the upper substrate 412 in the image drive area 410, and a black matrix (BM) 442 at both sides of the B-color filter 441 is disposed at the under side of the upper substrate 412, thereby preventing the light leakage of the image drive area 410.

A black matrix 424 for preventing light leakage is formed at the underside of the upper substrate 412 in the viewing angle control area 420, and the black matrix 424 is separately disposed so as not to overlap (to the inside) of the data lines 437, 438.

A G-color filter 443 is disposed at the underside of the upper substrate 412 in the image drive area 430, and a black matrix 444 at both sides of the G-color filter 443 is disposed at the under side of the upper substrate 412, thereby preventing the light leakage of the image drive area 430.

A lower polarizer 413 and an upper polarizer 414 may be formed to have the same transmission axis, or may be formed for their transmission axes to be at right angles to each other.

Alignment directions of the liquid crystal regions 417, 423, 435 may be formed by the same rubbing process, and thus may have the same alignment direction. The alignment directions of the liquid crystal regions 417, 423, 435 may be formed to be identical to the transmission axis of the lower polarizer 413, or may be formed to be vertical to the transmission axis of the lower polarizer 413.

Accordingly, in this example of an image drive area 410 driven by the IPS mode, light linearly polarized by the lower polarizer 413 transmits through the liquid crystal, and no phase change is caused by the liquid crystal of the first liquid crystal layer 417 in the state that the power supply is turned on, thus the polarization direction is not changed. The linearly polarized light having passed through the first liquid crystal region 417 like this is made to be parallel to the transmission axis of the upper polarizer 414, thereby passing through the upper polarizer 414. That is to say, it becomes a normally white mode (NW mode) where a white screen appears when the power supply is turned off. The image drive area 430 is driven in the same manner.

A gate line (not shown) defining a unit pixel and a thin film transistor (not shown) formed at the crossing part of the gate line and the data line are formed in the upper part of the lower substrate 411. And, the pixel electrodes 415, 421, 433, the common electrodes 416, 422, 434 and an alignment film (not shown) for aligning the liquid crystal layers 418 in a plurality of regions 417, 423, 435 are provided. Such components will be omitted in FIG. 3 for the sake of explanation.

Figure 4:
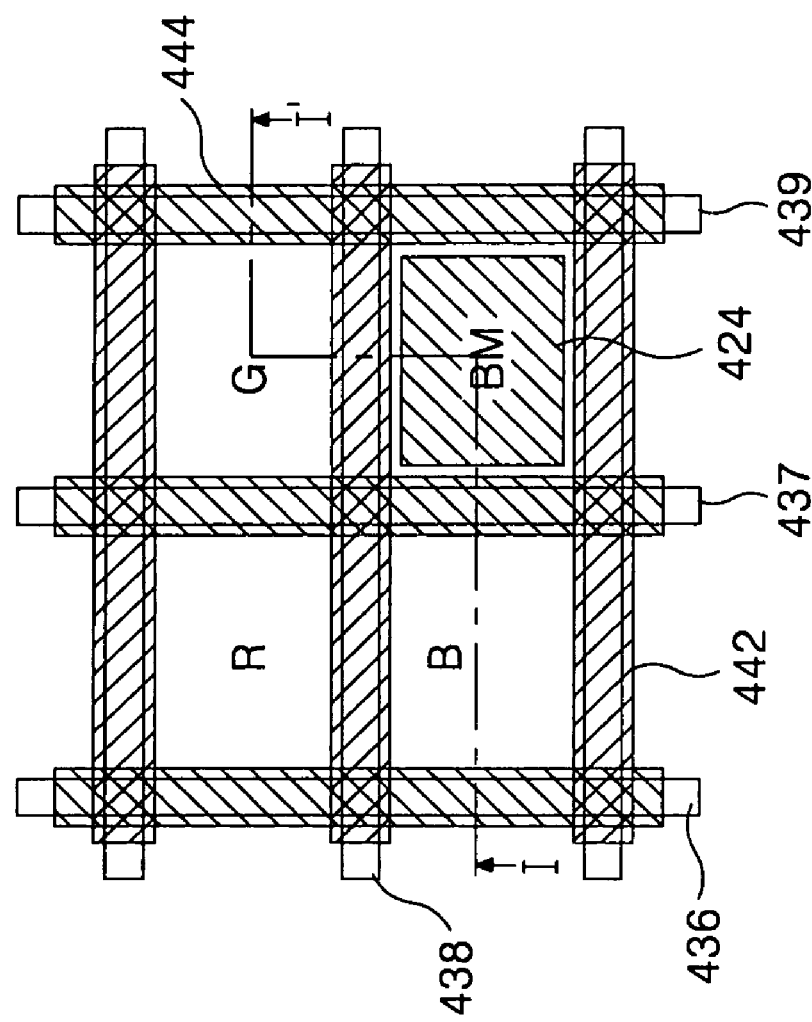
FIG. 4 is a plan view of the pixel of the liquid crystal display device of the present invention shown in FIG. 3.

FIG. 4 is a plan view of a pixel of a liquid crystal display device of the present invention. That is to say, the pixel of the liquid crystal display device of the present invention shown in FIG. 3 is a cross sectional diagram taken along the line I-I' of FIG. 6.

The viewing angle control area 420, which is adjacent to the image drive areas 410, 430, is driven independently from the image drive areas 410, 430. In reference to FIGS. 5A-5C, operational characteristics of the image drive area 410 and the viewing angle control area 420 pre described.

FIG. 5A is a first exemplary diagram representing an operational state of a pixel of the liquid crystal display device of the present invention, and is an exemplary diagram for explaining the operational state of when the pixel of the liquid crystal display device of the present invention is driven in a wide viewing angle mode. But, it is assumed for the sake of example that the lower polarizer 413 and the upper polarizer 414 have the same transmission axis.

Referring to FIG. 5A, in case that light is irradiated from a backlight unit 450 while the image drive area 410 is turned off, the light polarized by the lower polarizer 413 passes through the liquid crystal region 417, the molecules of which are arranged to be substantially parallel in an initial alignment state because no electric field is formed: No phase delay is generated so that no polarization state change is caused even though the linearly polarized light passes through the first liquid crystal region 417. That is, a longitudinal axis of the liquid crystal molecules of the first liquid crystal region 417, which are arranged to be substantially parallel to each other by an alignment film, is made to be substantially parallel to the transmission axis of the lower polarizer 413. Accordingly, the light having passed through the first liquid crystal region 417 passes through the upper polarizer 414 having the same transmission axis as the transmission axis of the lower polarizer 413, and white is thus displayed in the liquid crystal display panel.

If the data voltage and the common voltage are applied to the pixel electrode 421 and the common electrode 422 located in the viewing angle control area 420, respectively, so that the viewing angle control area 420 is turned on when the image drive area 410 is driven in a white mode like this, then the image drive area 410 is driven in the wide viewing angle mode.

If the wide viewing angle mode is set in this way, a potential difference is generated between the pixel electrode 421 and the common electrode 422, which are located in the viewing angle control area 420, to form a horizontal electric field. Liquid crystals of the second liquid crystal region 423 obtain a rotation force by the horizontal electric field to be aligned horizontally. At this moment, the light polarized by the lower polarizer 413 is aligned horizontally to pass through the liquid crystals of the second liquid crystal region 423, thereby generating the phase delay. That is to say, the light polarized through the lower polarizer 413 is phase-delayed by $\lambda/2$ in accordance with the horizontally-aligned liquid crystal cells of the second liquid crystal layer 423 so that the axis of the light that is incident from the lower polarizer 413 is changed to 90°. Accordingly, the axis of the light that passed through the horizontally-aligned liquid crystal cells of the second liquid crystal region 423 is made to be substantially perpendicular to the transmission axis of the upper polarizer 414. Thus, the light having passed through the horizontally-aligned liquid crystal cells of the second liquid crystal region 423 does not pass through the upper polarizer 414. Hereby, because the front and side surfaces of the viewing angle control area 420 all become the black state, the viewing angle control area 420 does not affect the image drive area 410 so that the liquid crystal display panel is driven with the wide viewing angle.

And, the liquid crystal display device of the present invention is automatically driven by the wide viewing angle mode in the initial state that it is neither set as the wide viewing angle mode nor set as the narrow viewing angle mode.

On the other hand, in case that the transmission axes of the lower polarizer 413 and the upper polarizer 414 are formed to be at right angles to each other, the liquid crystal display device of the present invention is driven in the wide viewing angle mode, as explained in reference to FIG. 5A, in a state that the image drive area 410 is turned on and the viewing angle control area 420 is turned off.

Figure 5B:
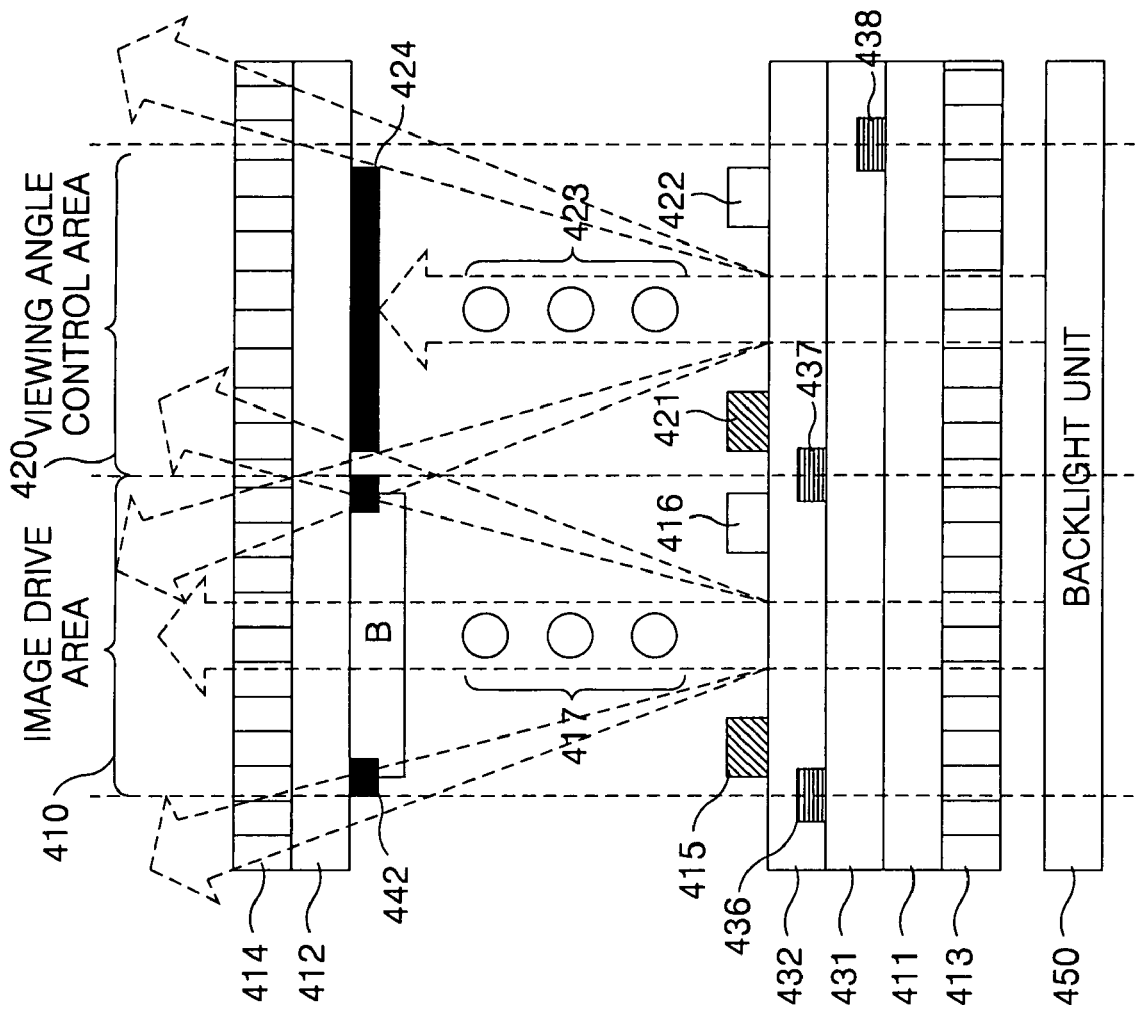
FIG. 5B is a second exemplary diagram representing an operational state of the pixel of the liquid crystal display device of the present invention.

FIG. 5B is a second exemplary diagram representing an operational state of a pixel of the liquid crystal display device of the present invention shown in FIG. 3, and an exemplary diagram for explaining the operational state of when the pixel of the liquid crystal display device of the present invention is driven in a narrow viewing angle mode. But, it is assumed for the sake of explanation that the lower polarizer 413 and the upper polarizer 414 have the same transmission axis.

Referring to FIG. 5B, in case that light is irradiated from the backlight unit 450 in a state that the image drive area 410 is turned off, the light polarized by the lower polarizer 413 passes through the first liquid crystal region 417 that is arranged to be parallel in the initial alignment state because no electric field is formed. Accordingly, as explained in reference to FIG. 5A, white is displayed in the image drive area 410.

When driving the image drive area 410 in the white mode like this, if the data voltage and the common voltage are not applied to the pixel electrode 421 and the common electrode 422 that are located in the viewing angle control area 420, respectively, so that the viewing angle control area 420 is turned off, then the image drive area 410 is driven in the narrow viewing angle mode.

If the narrow viewing angle mode is set in this way, no horizontal electric field is formed between the pixel electrode 421 and the common electrode 422 of the viewing angle control area 420 because the voltage is not applied to the viewing angle control area 420, thus the light polarized through the lower polarizer 413 passes through the second liquid crystal region 423 which is arranged to be substantially parallel in an initial alignment state by an alignment film. No phase delay is generated so that substantially no polarization state change is caused even though the linearly polarized light passes through the second liquid crystal region 423 because the liquid crystal molecules are aligned so that a longitudinal axis of the liquid crystals of the second liquid crystal region 423 is substantially parallel to the transmission axis of the lower polarizer 413. Accordingly, the light having passed through the second liquid crystal region 423 passes through the upper polarizer 414 having the same transmission axis as the transmission axis of the lower polarizer 413. At this moment, the black matrix 424 blocks the light transmitted through the front surface, thus it appears to be the black state in the front surface of the viewing angle control area 420, but the lower polarizer 413 and the upper polarizer 414 are formed to have the same transmission axis so that is appears to be the white state at the side surface of the viewing angle control area 420. In case of observing from the front surface of the liquid crystal display panel, there is no problem in seeing the image because there is no change in the image which is displayed in the viewing angle area 410, but in case of observing from the side surface of the liquid crystal display panel, an image displayed in the image drive area 410 appears to be blurred because the white appears due to the light leakage phenomenon, causing "crosstalk" or interference with the adjacent image drive area.

On the other hand, in case that the transmission axes of the lower polarizer 413 and the upper polarizer 414 are formed to be at right angles to each other, the liquid crystal display device of the present invention is driven in the narrow viewing angle mode, as explained in reference to FIG. 5B, in a state that the image drive area 410 is turned on and the viewing angle control area 420 is turned on.

Figure 5C:
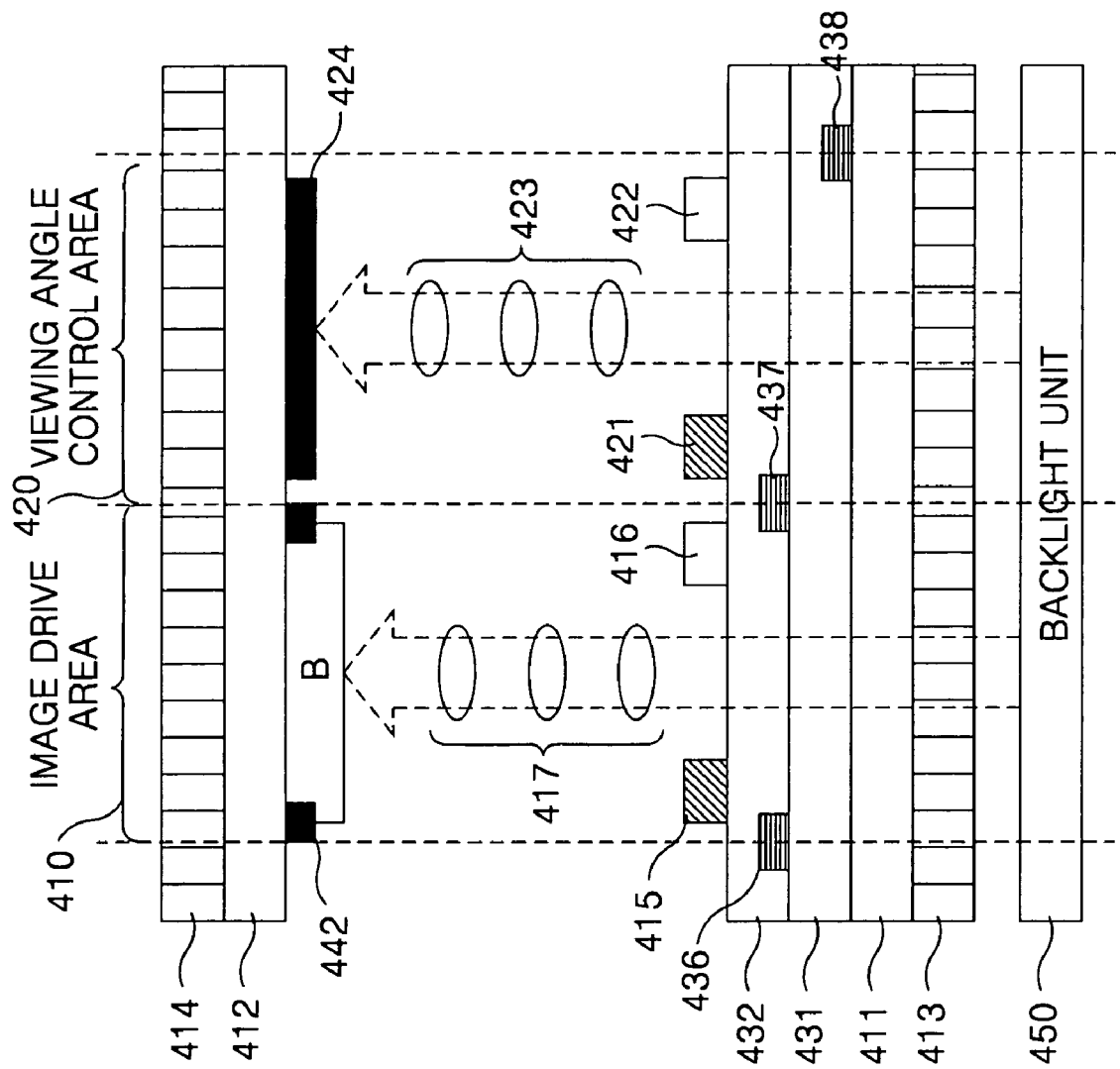
FIG. 5C is a third exemplary diagram representing an operational stage of the pixel of the liquid crystal display device of the present invention.

FIG. 5C is a third exemplary diagram representing an operational state of a pixel of the liquid crystal display device of the present invention shown in FIG. 5, and an exemplary diagram for explaining the operational state of when the pixel of the liquid crystal display device of the present invention is driven in a black mode. But, it is assumed for the sake of explanation that the lower polarizer 413 and the upper polarizer 414 have the same transmission axis.

Referring to FIG. 5C, if the image drive area 410 is turned on, the liquid crystals of the first liquid crystal region 417 obtain the horizontal electric field generated by the common electrode 415 and the pixel electrode 416 which are located in the image drive area 410, thereby being aligned horizontally. At this moment, the light irradiated from the backlight unit 450 to be polarized by the lower polarizer 413 passes through the liquid crystals of the first liquid crystal region 417, which is horizontally aligned, thereby generating the phase delay. That is to say, the polarized light passing through the lower polarizer 413 is phase-delayed by $\lambda/2$ in accordance with the horizontally-aligned liquid crystal cells of the first liquid crystal layer 417 so that the axis of the light which is incident from the lower polarizer 413 is changed to 90°. Accordingly, the axis of the light which passed through the horizontally-aligned liquid crystal cells of the first liquid crystal region 417 is made to be substantially perpendicular to the transmission axis of the upper polarizer 414. Thus, the light having passed through the horizontally-aligned liquid crystal cells of the first liquid crystal region 417 does not pass through the upper polarizer 414 to be blocked. Hereby, black is displayed in the image drive area 410.

On the other hand, in case that the transmission axes of the lower polarizer 413 and the upper polarizer 414 are formed to be at right angles to each other, the liquid crystal display device of the present invention is driven in the black mode, as explained in reference to FIG. 5C, in a state that the image drive area 410 is turned off and the viewing angle control area 420 is turned off.

Figure 6:
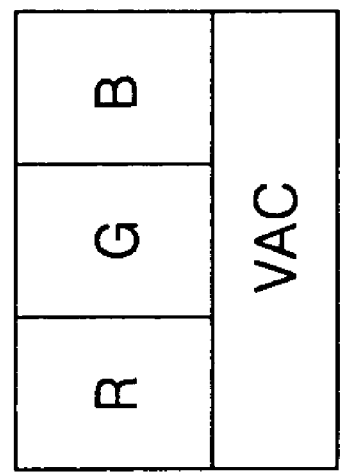
FIG. 6 is a diagram showing an arrangement structure of the pixel of the liquid crystal display device of the present invention

In another embodiment of the present invention, a plurality of image drive areas may correspond to a single viewing angle control area. As schematically illustrated in FIG. 6, the viewing angle control area 420 may be of a different size and orientation than the image drive areas 410, 415, 430.

In addition, because the image drive areas can be driven independently from the viewing angle control areas it is possible that the image drive areas can be driven according to a gray scale (e.g. 0 to 255 gray levels) while the viewing angle control area may be driven in only two states (e.g., on or off; black or white).

The liquid crystal display device of the IPS mode like this example has a relatively wider viewing angle than the liquid crystal display device of the vertical electric field drive method. A wide viewing angle is advantageous when many people should observe the same liquid crystal display device because a normal picture can be seen from any angle. Thus the wide viewing angle has an advantage as a general liquid crystal display device. However, when using the computer for personal purpose or carrying out security business, etc, such as bank business, etc, it may be desirable to drive the liquid crystal display at the narrow viewing angle to limit the displayed information from being viewed by people in the surrounding environment. Thus the present invention allows the viewing angle control area 420 from the image drive area 410, which is driven by the IPS mode to electrically control the narrow viewing angle and the wide viewing angle.

As described above, the present invention forms the image drive area 410 and the viewing angle control area 420 in each pixel of the liquid crystal display panel to electrically control the black state and the white state of the viewing angle control area 420, thereby helping for the good of the user.

As described above, the present invention electrically controls the wide viewing angle and the narrow viewing angle of the liquid crystal display panel, to the benefit of the user. And, it is not necessary to separately buy a viewing angle control film, thus it is possible to reduce the cost that is required for buying the viewing angle control film.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
   lower and upper substrates facing each other and bonded together with a cell gap therebetween;
   a lower polarizer attached to a surface of the lower substrate;
   an upper polarizer attached to a surface of the upper substrate;
   liquid crystals in the cell gap;
   a plurality of image drive areas defined in the bonded lower and upper substrates;
   a first electrode group on the lower substrate in the image drive areas having an image drive voltage therebetween, the liquid crystals in the image drive areas controllable according to the image drive voltage;
   a plurality of viewing angle control areas defined in the bonded lower and upper substrates, for controlling a wide viewing angle or a narrow viewing angle;
   a first black matrix on a lower part of the upper substrate except the image drive areas and the viewing angle control areas;
   a second black matrix in the viewing angle control areas for preventing light leakage in the viewing angle control areas;
   a second electrode group on the lower substrate in the viewing angle control areas having a viewing angle control voltage therebetween, the liquid crystals in the viewing angle control areas controllable according to the viewing angle control voltage; and
   color filter layers on a rear surface of the upper substrate in the image drive areas, wherein the color filter layers are not formed on a rear surface of the upper substrate in the viewing angle control areas,
   wherein the lower substrate has a plurality of gate lines and a plurality of data lines, the first black matrix disposed so as to overlap with the gate and data lines, and the second black matrix is separately disposed so as not to overlap with the data lines.

2. The liquid crystal display device according to claim 1, wherein the liquid crystals in the image drive areas are aligned in the same direction as the liquid crystals in the viewing angle control areas.

3. The liquid crystal display device according to claim 2, wherein the lower polarizer and the upper polarizer have the same transmission axis.

4. The liquid crystal display device according to claim 3, wherein the liquid crystals in the image drive areas and the liquid crystals in the viewing angle control areas are aligned in substantially the same direction.

5. The liquid crystal display device according to claim 2, wherein the transmission axes of the lower polarizer and the upper polarizer are at right angles to each other.

6. The liquid crystal display device according to claim 5, wherein the liquid crystals in the image drive areas and in the viewing angle control areas are aligned in substantially the same direction as the lower polarizer.

7. The liquid crystal display device according to claim 1, wherein the first electrode group includes a common electrode and a pixel electrode.

8. The liquid crystal display device according to claim 7, wherein the liquid crystal cells in the image drive area are horizontally aligned by a horizontal electric field caused by the first electrode group.

9. The liquid crystal display device according to claim 1, wherein the second electrode group includes a common electrode and a pixel electrode.

10. The liquid crystal display device according to claim 9, wherein the liquid crystal cells in the viewing angle control areas are horizontally aligned by a horizontal electric field caused by the second electrode group.

11. The liquid crystal display device according to claim 1, wherein the image drive areas and the viewing angle control areas are independently driven.

12. A liquid crystal display device, comprising:
lower and upper substrates facing each other and bonded together with a cell gap therebetween;
a lower polarizer attached to a surface of the lower substrate;
an upper polarizer attached to a surface of the upper substrate;
liquid crystals in the cell gap;
an image drive area defined in the bonded lower and upper substrates;
a first electrode group on the lower substrate in the image drive area, the liquid crystals in the image drive area controllable according to an image drive voltage between electrodes of the first electrode group;
a viewing angle control area defined in the bonded lower and upper substrates corresponding at least one image drive area, for controlling a wide viewing angle or a narrow viewing angle;
a first black matrix on a lower part of the upper substrate except the image drive area and the viewing angle control area;
a second black matrix in the viewing angle control area, for preventing light leakage in the viewing angle control area;
a second electrode group on the lower substrate in the viewing angle control area, the liquid crystals in the viewing angle control area controllable according to a viewing angle control voltage between electrodes of the second electrode group; and
a color filter layer on a rear surface of the upper substrate in the image drive area, wherein the color filter layer is not formed on a rear surface of the upper substrate in the viewing angle control area,
wherein the lower substrate has a plurality of gate lines and a plurality of data lines, the first black matrix disposed so as to overlap with the gate and data lines, and the second black matrix is separately disposed so as not to overlap with the data lines.

* * * * *